UNITED STATES PATENT OFFICE.

MAX ENGELMANN, BENEDIKT MERKEL, AND GEORG WESENBERG, OF ELBERFELD, GERMANY, ASSIGNORS TO FARBENFABRIKEN VORM. FRIEDR. BAYER & CO., OF ELBERFELD, GERMANY, A CORPORATION OF GERMANY.

DISINFECTING AGENTS.

1,034,093. Specification of Letters Patent. Patented July 30, 1912.

No Drawing. Application filed December 30, 1910. Serial No. 600,082.

*To all whom it may concern:*

Be it known that we, MAX ENGELMANN, BENEDIKT MERKEL, and GEORG WESENBERG, chemists, citizens of the German Empire, residing at Elberfeld, Germany, have invented new and useful Improvements in New Disinfecting Agents, of which the following is a specification.

It has been observed that the salts of the hitherto unknown mercuric compounds of substituted benzoic acids especially alkyl-, halogen-, or alkyl-halogen-benzoic acids substituted in the nucleus have a disinfectant power, superior in many cases to that of sublimate, especially in the presence of soap or of serum. The above mentioned compounds are therefore therapeutically valuable products.

The new bodies containing in their molecule the characteristic group

R meaning a benzol substance, are obtained by treating the corresponding acids with mercuric oxid or mercuric salts at higher temperatures or by heating e. g. the mercuric salts of toluylic acids or of halogen benzoic acids in presence or absence of fusion agents or solvents. The new products are whitish crystalline compounds which are soluble in dilute alkalis forming salts and insoluble in alcohol, ether and benzene. On being boiled with hydro-chloric acid they are split up $HgCl_2$ being produced.

In order to illustrate the new process more fully the following examples are given, the parts being by weight:

Example 1: 100 parts of ortho-toluylic acid are well mixed with 40 parts of mercuric oxid and heated in an oil bath at from 130–140° C. until a test portion of the melt forms a clear solution with caustic soda lye. After cooling the mixture is extracted with alcohol and dissolved in highly diluted caustic soda lye in order to remove the excess of acid. By passing carbonic acid through the solution the anhydrid of the mercuric-ortho-toluylic acid

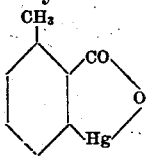

is precipitated as a fine white crystalline powder. It is almost insoluble in water and the usual organic solvents, but it is very easily soluble in alkalis forming the corresponding salts. By heating it with hydrochloric acid the compound is split up into ortho-toluylic acid and mercuric chlorid. On being heated it is decomposed without melting.

Example 2: 100 parts of ortho-chloro-benzoic acid and 60 parts of mercuric acetate are heated in an oil bath to from 130–140° C. until a test portion forms a clear solution with caustic soda lye. In order to remove the excess of acid the cooled mass is treated with dilute alkali and for this purpose the melt is dissolved in highly diluted caustic soda care being taken to avoid an excess and the solution is then filtered. By passing carbonic acid through the solution the anhydrid of oxymercuric-ortho-chloro-benzoic acid

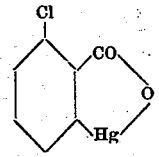

is precipitated as a white crystalline powder. It does not differ in its properties from the compound described according to Example 1.

Example 3: 100 parts of the mercury salt or ortho-iodo-benzoic acid (obtainable by treating the sodium salt of ortho-iodo-benzoic acid with mercuric chlorid in aqueous solution) suspended in 400 parts of paraffin oil are heated at from 170–180° C. until mercuric oxid is no more precipitated from a test portion by the addition of soda lye.

The paraffin oil is removed by treatment with alcohol and the residue is purified by solution in caustic soda lye and reprecipitation with carbonic acid. The anhydrid of the mercuric ortho-iodo-benzoic acid

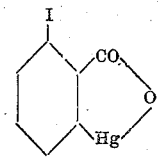

has properties similar to the ortho-chlorin compound.

Instead of the ortho-toluylic or ortho-chloro-benzoic acid also other of the above mentioned acids can be used, e. g. ortho-bromo-benzoic acid or metatoluylic acid.

We claim:—

1. The herein described mercuric compound of benzoic acids substituted in the nucleus containing in their molecule the characteristic group

in which R stands for a benzol substance unsubstituted by an oxy group in ortho position to the —CO— group, which are whitish crystalline compounds soluble in dilute alkalis forming salts, insoluble in alcohol, ether and benzene, splitting off $HgCl_2$ on being boiled with hydrochloric acid; and being valuable disinfectants, substantially as described.

2. The herein described mercuric compounds of benzoic acids substituted in the nucleus, containing in their molecule the characteristic group

in which R stands for an alkyl substituted benzol substance, which are whitish crystalline compounds soluble in dilute alkalis forming salts. insoluble in alcohol, ether and benzene, splitting off $HgCl_2$ on being boiled with HCl; and being valuable disinfectants, substantially as described.

3. The herein described mercuric compounds of benzoic acids substituted in the nucleus, containing in their molecule the characteristic group

in which R stands for an alkyl substituted benzol substance, which are whitish crystalline compounds soluble in dilute alkalis forming salts, insoluble in alcohol, ether and benzene, splitting off $HgCl_2$ on being boiled with HCl; and being valuable disinfectants, substantially as described.

4. The herein described oxy-mercuric-toluylic acid anhydrid obtainable by heating ortho-toluylic acid with mercuric oxid, which is a white crystalline powder soluble in dilute alkalis, insoluble in alcohol, ether and benzene, being split up into ortho-toluylic acid and mercuric chlorid on being boiled with hydrochloric acid; and being a valuable disinfectant, substantially as described.

In testimony whereof we have hereunto set our hands in the presence of two subscribing witnesses.

MAX ENGELMANN. [L. S.]
BENEDIKT MERKEL. [L. S.]
GEORG WESENBERG. [L. S.]

Witnesses:
 Chas. J. Wright,
 Alfred Henkel.